(12) United States Patent
Mott et al.

(10) Patent No.: US 12,094,326 B2
(45) Date of Patent: Sep. 17, 2024

(54) LENS FOR A VISUAL ALARM DETECTOR

(71) Applicant: Carrier Corporation, Palm Beach Gardens, FL (US)

(72) Inventors: Kenneth J. Mott, Colorado Springs, CO (US); Narval Danvers, Denver, CO (US); Ryan Kelley, Denver, CO (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 813 days.

(21) Appl. No.: 17/042,643

(22) PCT Filed: Mar. 29, 2019

(86) PCT No.: PCT/US2019/024907
§ 371 (c)(1),
(2) Date: Sep. 28, 2020

(87) PCT Pub. No.: WO2019/191631
PCT Pub. Date: Oct. 3, 2019

(65) Prior Publication Data
US 2021/0035419 A1    Feb. 4, 2021

Related U.S. Application Data

(60) Provisional application No. 62/650,848, filed on Mar. 30, 2018.

(51) Int. Cl.
*G08B 5/36*        (2006.01)
*G02B 3/00*        (2006.01)
(Continued)

(52) U.S. Cl.
CPC ................. *G08B 5/36* (2013.01); *G02B 3/00* (2013.01); *G02B 19/00* (2013.01); *G02B 27/00* (2013.01)

(58) Field of Classification Search
CPC ............ G08B 5/36; G02B 3/00; G02B 19/00; G02B 27/00; G02B 19/0066; G02B 19/0014
See application file for complete search history.

(56) References Cited

U.S. PATENT DOCUMENTS 3,875,561 A    4/1975  Scarpino et al.
3,916,209 A    10/1975 Steele et al.
(Continued)

FOREIGN PATENT DOCUMENTS

CN    300781532        5/2008
CN    102789916 A      11/2012
(Continued)

OTHER PUBLICATIONS

International Preliminary Report on Patentability; Application No. PCT/US2019/024907; Mailed Oct. 15, 2020; 11 pages.
3 LED Lights Stick Click Tap Cordless Touch Push Lamp Battery AAA Powered For Car, Product Description, DHGate.com, Retrieved from https://www.dhgate.com/product/3-led-lights-stick-click-tap-cordless-touch/165611474.html on Feb. 25, 2019 (9 pp.).
(Continued)

*Primary Examiner* — Balram T Parbadia
*Assistant Examiner* — Gabriel A Sanz
(74) *Attorney, Agent, or Firm* — CANTOR COLBURN LLP

(57) ABSTRACT

A dome lens extending upwardly about a center axis A and outwardly in a radial direction R, having: a first portion forming a first annular ring about the center axis A that includes a first inner surface that is convex, and being oriented so that a first tangent to the first inner surface is at a first angle to the center axis A that is less than forty-five degrees; a second portion being continuous with the first portion and forming a second annular ring about the center axis A and including a second inner surface that is convex,
(Continued)

and being oriented so a second tangent to the second inner surface is canted toward the center axis A; a third portion being continuous with the second portion to enclose the lens, forming an annular solid disk about the center axis A, and including a third inner surface that is convex.

16 Claims, 3 Drawing Sheets

(51) Int. Cl.
*G02B 19/00* (2006.01)
*G02B 27/00* (2006.01)

(56) References Cited

U.S. PATENT DOCUMENTS

| | | |
|---|---|---|
| 4,340,885 A | 7/1982 | Chavis et al. |
| 4,827,244 A | 5/1989 | Bellavia et al. |
| 4,968,860 A | 11/1990 | Shinohara et al. |
| 4,987,279 A | 1/1991 | Hirose et al. |
| 5,103,383 A | 4/1992 | Mayhew |
| 5,285,037 A | 2/1994 | Baranski et al. |
| 5,391,848 A | 2/1995 | Murphy |
| 5,392,202 A | 2/1995 | Herron |
| 5,785,410 A | 7/1998 | Del Branson, Sr. |
| 5,813,519 A | 9/1998 | Gotoh |
| 5,831,538 A | 11/1998 | Schena |
| D412,924 S | 8/1999 | Hiraguchi |
| 5,998,929 A | 12/1999 | Bechtel et al. |
| 6,348,860 B1 | 2/2002 | Davis et al. |
| 6,388,220 B1 | 5/2002 | Sasaki et al. |
| 6,414,801 B1 | 7/2002 | Roller |
| 6,425,678 B1 | 7/2002 | Verdes et al. |
| 6,678,001 B1 | 1/2004 | Elberbaum |
| D497,927 S | 11/2004 | Arbuckle et al. |
| 6,858,812 B2 | 2/2005 | Sasaki et al. |
| 6,902,287 B2 | 6/2005 | Taylor |
| D513,477 S | 1/2006 | Heftman |
| 7,079,041 B2 | 7/2006 | Fredericks et al. |
| D544,805 S | 6/2007 | Corrigan et al. |
| 7,235,752 B1 | 6/2007 | Chen et al. |
| D552,501 S | 10/2007 | Lin et al. |
| D556,235 S | 11/2007 | Todd et al. |
| D558,248 S | 12/2007 | Togawa et al. |
| D560,244 S | 1/2008 | Naruki |
| D564,557 S | 3/2008 | Yamamoto et al. |
| D570,722 S | 6/2008 | Taylor |
| 7,385,359 B2 | 6/2008 | Dowling et al. |
| D584,756 S | 1/2009 | Yamakawa |
| 7,482,712 B2 | 1/2009 | Ford et al. |
| D591,697 S | 5/2009 | Andrews et al. |
| D592,088 S | 5/2009 | Miller |
| D598,316 S | 8/2009 | Kuwano |
| D601,053 S | 9/2009 | Ferrie et al. |
| 7,581,854 B2 | 9/2009 | Ford |
| D605,966 S | 12/2009 | Weil |
| 7,636,049 B2 | 12/2009 | Ellul, Jr. |
| D612,760 S | 3/2010 | Chen et al. |
| 7,699,603 B2 | 4/2010 | Furner et al. |
| D616,780 S | 6/2010 | Smith |
| 7,744,246 B2 | 7/2010 | Rizkin et al. |
| 7,791,595 B2 | 9/2010 | Altonen et al. |
| D628,225 S | 11/2010 | Deurwaarder |
| D633,120 S | 2/2011 | Ham |
| D639,328 S | 6/2011 | Zeinoun et al. |
| D639,843 S | 6/2011 | Zeinoun et al. |
| 7,997,764 B1 | 8/2011 | Nielson |
| D644,677 S | 9/2011 | Park |
| D647,553 S | 10/2011 | Park |
| 8,049,427 B2 | 11/2011 | Altonen et al. |
| D660,738 S | 5/2012 | Yu |
| 8,232,884 B2 | 7/2012 | Pattok et al. |
| 8,237,377 B2 | 8/2012 | Hopper |
| D669,806 S | 10/2012 | Stein |
| D669,807 S | 10/2012 | Stein |
| D673,869 S | 1/2013 | Yu |
| D684,078 S | 6/2013 | Clifford et al. |
| 8,628,219 B2 | 1/2014 | Peck et al. |
| D701,466 S | 3/2014 | Clifford et al. |
| D709,782 S | 7/2014 | Stuffle |
| 8,988,232 B1 | 3/2015 | Sloo et al. |
| 9,035,786 B2 | 5/2015 | Clifford et al. |
| D740,870 S | 10/2015 | Park |
| D742,447 S | 11/2015 | Stark et al. |
| 9,228,713 B2 | 1/2016 | Skertic, Jr. et al. |
| 9,288,877 B2 | 3/2016 | Pratt et al. |
| 9,332,610 B2 | 5/2016 | Kuo et al. |
| 9,345,098 B2 | 5/2016 | Joseph et al. |
| 9,430,925 B2 | 8/2016 | Mittleman |
| 9,466,194 B1 | 10/2016 | Kraz et al. |
| 9,549,448 B2 | 1/2017 | Pope et al. |
| 9,553,451 B2 | 1/2017 | Zacharchuk et al. |
| 9,572,221 B2 | 2/2017 | Chang et al. |
| 9,618,184 B2 | 4/2017 | Buchholz et al. |
| 9,622,321 B2 | 4/2017 | Creasman et al. |
| D798,934 S | 10/2017 | Wu |
| 9,799,175 B2 | 10/2017 | Stagg |
| 10,825,313 B2 | 11/2020 | Mott et al. |
| 11,017,964 B2 | 5/2021 | Wu |
| D931,749 S | 9/2021 | Zhong |
| 11,354,995 B2 | 6/2022 | Buchholz et al. |
| 11,423,071 B1 | 8/2022 | Olshansky |
| 11,694,525 B2 | 7/2023 | Buchholz et al. |
| 2004/0095253 A1 | 5/2004 | Tanguay |
| 2004/0112114 A1 | 6/2004 | Penney et al. |
| 2004/0189461 A1 | 9/2004 | Tice |
| 2005/0258973 A1 | 11/2005 | Black et al. |
| 2006/0202847 A1 | 9/2006 | Oppelt et al. |
| 2006/0263733 A1 | 11/2006 | Furner et al. |
| 2007/0020572 A1 | 1/2007 | Furner et al. |
| 2007/0291472 A1 | 12/2007 | Finkle |
| 2008/0170409 A1* | 7/2008 | Tendo ............... F21S 41/275 362/538 |
| 2008/0291037 A1 | 11/2008 | Lax |
| 2009/0267357 A1 | 10/2009 | Hall et al. |
| 2010/0073172 A1 | 3/2010 | Lax |
| 2010/0328958 A1* | 12/2010 | Zhang ............... G02B 19/0014 362/311.02 |
| 2011/0050104 A1 | 3/2011 | Finkle |
| 2011/0080736 A1 | 4/2011 | Brands et al. |
| 2011/0187543 A1 | 8/2011 | Russo et al. |
| 2011/0193697 A1 | 8/2011 | Albert et al. |
| 2012/0086345 A1 | 4/2012 | Tran |
| 2012/0160642 A1 | 6/2012 | Liao |
| 2012/0171987 A1 | 7/2012 | Newman |
| 2012/0238319 A1 | 9/2012 | Lake |
| 2012/0321321 A1 | 12/2012 | Riesebosch |
| 2013/0094218 A1* | 4/2013 | Wang ............... G02B 27/0955 362/335 |
| 2013/0155690 A1* | 6/2013 | Chen ............... G02F 1/133603 362/335 |
| 2013/0293098 A1* | 11/2013 | Li ............... F21K 9/27 264/1.7 |
| 2014/0085093 A1 | 3/2014 | Mittleman et al. |
| 2014/0239162 A1 | 8/2014 | Carlson et al. |
| 2014/0268753 A1 | 9/2014 | Buchholz et al. |
| 2014/0292506 A1 | 10/2014 | Rapeanu et al. |
| 2014/0333928 A1 | 11/2014 | Erdtmann |
| 2014/0340913 A1 | 11/2014 | Cui |
| 2015/0096352 A1 | 4/2015 | Peterson et al. |
| 2015/0097689 A1 | 4/2015 | Logue et al. |
| 2015/0109137 A1 | 4/2015 | Carrington |
| 2015/0145406 A1* | 5/2015 | Li ............... F21K 9/232 264/1.7 |
| 2015/0339896 A1 | 11/2015 | Stagg |
| 2016/0027266 A1 | 1/2016 | McDonagh et al. |
| 2016/0033115 A1 | 2/2016 | Savage, Jr. et al. |
| 2016/0088202 A1 | 3/2016 | Tsai et al. |
| 2017/0085319 A1 | 3/2017 | Latham et al. |
| 2017/0089567 A1 | 3/2017 | Penrod et al. |
| 2017/0140619 A1 | 5/2017 | Russo et al. |
| 2017/0154740 A1 | 6/2017 | Luo |
| 2017/0184292 A1 | 6/2017 | Weeks et al. |

(56) References Cited

U.S. PATENT DOCUMENTS

| | | |
|---|---|---|
| 2017/0200575 A1 | 7/2017 | Ford |
| 2017/0314776 A1 | 11/2017 | Huang |
| 2017/0328997 A1 | 11/2017 | Silverstein et al. |
| 2017/0336055 A1 | 11/2017 | Rinko et al. |
| 2018/0066806 A1 | 3/2018 | Wang et al. |
| 2018/0128478 A1 | 5/2018 | Beyer |
| 2018/0142880 A9 | 5/2018 | Huang |
| 2018/0212371 A1 | 7/2018 | Xu |
| 2018/0310389 A1 | 10/2018 | Recker et al. |
| 2018/0343402 A1 | 11/2018 | Roth et al. |
| 2019/0069078 A1 | 2/2019 | Johnson et al. |
| 2019/0181595 A1 | 6/2019 | Jensen |
| 2019/0203888 A1 | 7/2019 | Kraz et al. |
| 2019/0285269 A1 | 9/2019 | Penrod et al. |
| 2019/0297706 A1 | 9/2019 | Huang et al. |
| 2019/0304281 A1 | 10/2019 | Mott et al. |
| 2019/0311595 A1 | 10/2019 | Lacy |
| 2020/0294735 A1 | 9/2020 | Wu |
| 2021/0142638 A1 | 5/2021 | Buchholz et al. |
| 2021/0158663 A1 | 5/2021 | Buchholz et al. |
| 2022/0277634 A1 | 9/2022 | Buchholz et al. |

FOREIGN PATENT DOCUMENTS

| | | |
|---|---|---|
| CN | 102214653 B | 2/2013 |
| CN | 202852641 U | 4/2013 |
| CN | 203188142 U | 9/2013 |
| CN | 103515131 A | 1/2014 |
| CN | 303087957 S | 1/2015 |
| CN | 303093901 S | 2/2015 |
| CN | 206989056 U | 2/2018 |
| DE | 102008029698 A1 | 1/2010 |
| EP | 1261978 A1 | 12/2002 |
| EP | 2455651 A2 | 5/2012 |
| EP | 2480822 A1 | 8/2012 |
| EP | 2518747 A1 | 10/2012 |
| FR | 2975809 A1 | 11/2012 |
| KR | 200262311 Y1 | 3/2002 |
| KR | 200307344 Y1 | 3/2003 |
| WO | D51537 | 2/2000 |
| WO | 0169617 A1 | 9/2001 |
| WO | 2011037884 A1 | 3/2011 |
| WO | 2014162131 A1 | 10/2014 |
| WO | 2017045378 A1 | 3/2017 |
| WO | 2019014112 A1 | 1/2019 |

OTHER PUBLICATIONS

ADA Compliant Solutions, Product Description, SDC Security Door Controls, Retrieved from http://www.sdcsecurity.com/ADA-Compliant-Solutions.htm on Feb. 25, 2019 (4 pp.).

Big Dome Pushbutton-Red, Product Description, Sparkfun Electronics, Retrieved at https://www.sparkfun.com/products/9181 on Feb. 25, 2019 (8 pp.).

CNIPA, International Design, CN300781532, The lighting pushbutton switch (LAS1GQ-11D) only, Zhejiang Hongbo Button Manufacturing Co Ltd., May 21, 2008, (2pp.).

International Search Report for Application No. PCT/US2018/041267; Issued Dec. 18, 2018; (8 pp).

International Search Report; PCT/US2019/024907; ISR/EPO; Issued Jul. 4, 2019; 5 Pages.

LA42(A) series (22) 22 mm waterproof push button switches, Tayee, Product Description, Retrieved at http://www.tayee-electric.com/product/la42-aseries-22-push-button-switch.html, on Feb. 25, 2019 (2 pp.).

Meridian LED Push-Button Tap Light, Product Description, Walmart.com, Retrieved from https://www.walmart.com/ip/Meridian-LED-Push-Button-Tap-Light-Silver/26441657 on Feb. 25, 2019 (8 pp.).

Non-Final Office Action; U.S. Appl. No. 16/290,482; dated Oct. 18, 2019; 22 pages.

Notice of Allowance; U.S. Appl. No. 16/290,482; Application Filing Date: Mar. 1, 2019; Date of Mailing: Jun. 26, 2020; 9 pages.

U.S. Final Office Action; U.S. Appl. No. 16/290,482; Application Filing Date: Mar. 1, 2019; Date of Mailing: Apr. 16, 2020; 16 pages.

Wollaston, Victoria, "The smart smoke alarm that Texts you if there's a fire in your house- and really can be switched off with a wave of the hand", DailyMail.com, Published on Oct. 10, 2013, Retrieved at https://www.dailymail.co.uk/sciencetech/article-2451271/Smart-smoke-alarm-TEXTS-theres-house.html on Feb. 25, 2019 (28 pp.).

World Intellectual Property Organization, International Registration No. DM/051 537, date of registration Feb. 14, 2000 (6pp.).

Written Opinion of the International Searching Authority, for International Application No. PCT/US2018/041267, issued Dec. 18, 2018 (10 pp.).

Office Action for European Application No. 18746451.6; Date: Dec. 2, 2021; 8 pages.

Notice of Allowance issued in U.S. Appl. No. 17/747,519, dated mailed Sep. 6, 2023.

* cited by examiner

LENS FOR A VISUAL ALARM DETECTOR

CROSS REFERENCE TO RELATED APPLICATIONS

This is a US National Stage of Application No. PCT/US2019/024907, filed on Mar. 29, 2019, which claims the benefit of U.S. Application No. 62/650,848 filed Mar. 30, 2018, the disclosures of which are incorporated herein by reference.

BACKGROUND

Exemplary embodiments pertain to the art of visual alarm detectors (VADs) and more specifically to a configuration of a lens for a VAD.

VAD designs may use a set of ten (10) light emitting diodes (LED) to provide strobe light output. Such designs may provide at least a threshold minimum amount of lighting. Utilizing fewer LEDs may be desirable in a configuration that may provide at least the threshold minimum amount of lighting.

BRIEF DESCRIPTION

A lens for covering an array of light emitting diodes (LEDs) mounted to a printed circuit board (PCB) in a visual alarm device (VAD), the lens being a dome lens extending upwardly in an axial direction about a center axis A and outwardly in a radial direction R, the lens comprising: a first portion which is a bottom portion, the first portion forming a first annular ring about the center axis A, the first portion including a first inner surface that is convex and a first outer surface, wherein the first portion is oriented so that a first tangent to the first inner surface is at a first angle to the center axis A wherein the first angle is between less than forty-five degrees, a second portion which is an intermediate portion, the second portion being continuous with the first portion, the second portion forming a second annular ring about the center axis A, the second portion including a second inner surface that is convex and a second outer surface, wherein the second portion is oriented so that a second tangent to the second inner surface is canted toward the center axis A, a third portion which is a top portion that is continuous with the second portion to enclose the lens, the third portion forming an annular solid disk about the center axis A, the third portion including a third inner surface that is convex and a third outer surface.

In addition to one or more of the above disclosed features, or as an alternative, the first inner surface, the second inner surface and the third inner surface together form a lens composite inner surface that is aberration-free and continuous.

In addition to one or more of the above disclosed features, or as an alternative, the first outer surface, the second outer surface and the third outer surface are each convex and together form a lens composite outer surface that is an aberration-free and continuous dome.

In addition to one or more of the above disclosed features, or as an alternative, the first angle is less than thirty degrees.

In addition to one or more of the above disclosed features, or as an alternative, the first tangent to the first inner surface is substantially parallel to the center axis A.

In addition to one or more of the above disclosed features, or as an alternative, a bottom surface of the first portion is substantially planar.

In addition to one or more of the above disclosed features, or as an alternative, wherein the lens is thickest along the bottom surface of the first portion.

In addition to one or more of the above disclosed features, or as an alternative, the lens is thinnest at a first interface between the second portion and the third portion.

In addition to one or more of the above disclosed features, or as an alternative, the lens continuously increases in thickness in the second portion between the first interface and a second interface between the first portion and the second portion.

In addition to one or more of the above disclosed features, or as an alternative, the lens continuously increases in thickness in the first portion between the second interface and the bottom surface.

In addition to one or more of the above disclosed features, or as an alternative, the lens includes a fourth portion which is a base portion that extends axially below the first portion, the fourth portion being cylindrical and having a fourth outer surface that is continuous with the first outer surface, and a fourth inner surface that extends downwardly from the bottom surface of the first portion, wherein the fourth inner surface and the bottom surface are configured to be positioned against the PCB.

In addition to one or more of the above disclosed features, or as an alternative, when the lens is positioned against the PCB, with a lens element in the LED array having a height HL and the LED array having a diameter of DL: a first height H1 of the first portion is $0.75*HL<H1<3*HL$, a second height H2 of the second portion 136 is $3*HL<H2<5*HL$, a first diameter D1 of the first portion is $1.25*DL<D1<2*DL$, a second diameter D2 at the second interface is $DL<D2<1.5*DL$, and a third diameter D3 at the first interface is $0.5*DL<D3<DL$.

Further disclosed is a visual alarm device (VAD) comprising: a printed circuit board (PCB) including an array of light emitting diodes (LEDs); and a lens covering the PCB, the lens having one or more of the above disclosed features. Yet further disclosed is a method of refracting light from an array of LEDs in a visual alarm device VAD comprising directing light from the array of LEDs through a lens, the lens comprising one or more of the above disclosed features.

BRIEF DESCRIPTION OF THE DRAWINGS

The following descriptions should not be considered limiting in any way. With reference to the accompanying drawings, like elements are numbered alike.

DESCRIPTION

A detailed description of one or more embodiments of the disclosed apparatus and method are presented herein by way of exemplification and not limitation with reference to the Figures.

Figure 1:
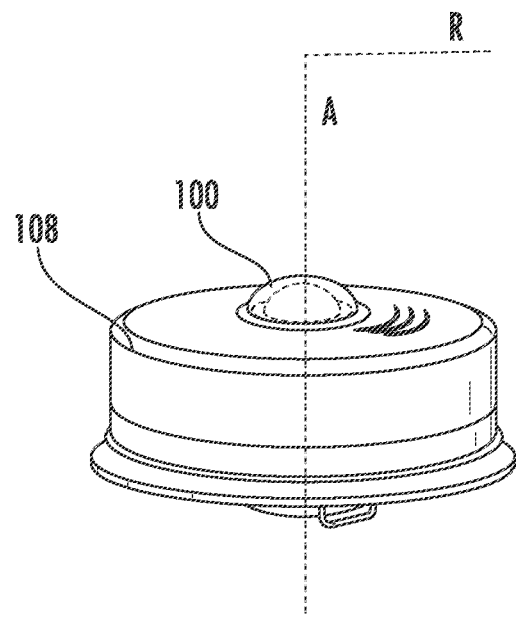
FIG. 1 illustrates a VAD according to an embodiment.
Figure 2:
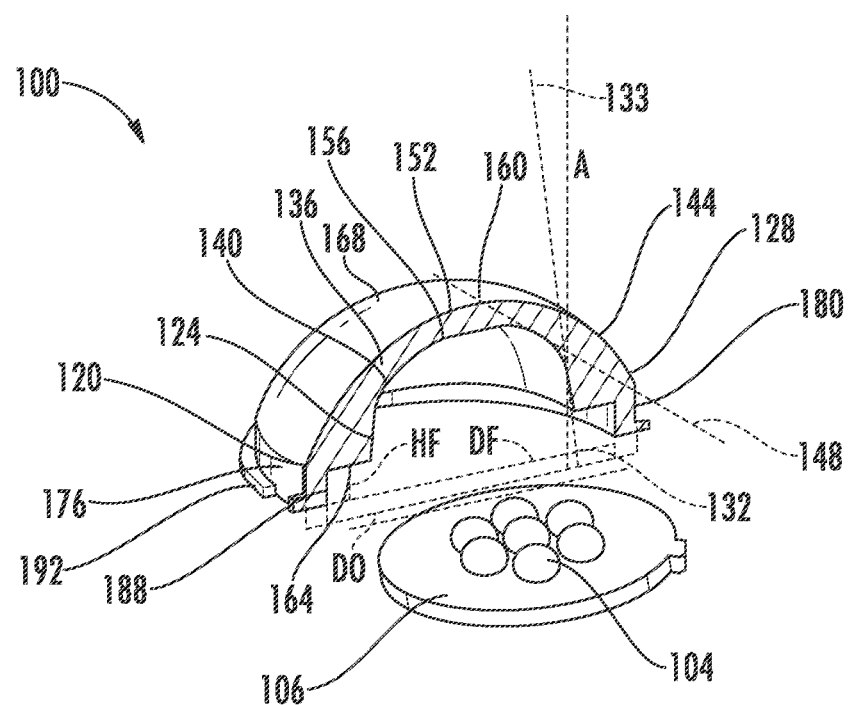
FIG. 2 illustrates cross sectional view of a lens according to an embodiment.

Turning to FIGS. 1 and 2, disclosed is a lens 100 for covering an array 104 of light emitting diodes (LEDs) mounted to a printed circuit board PCB 106 in a visual alarm device (VAD) 108. The array includes seven LEDs in a packed configuration. The lens 100 may be a dome lens extending upwardly in an axial direction about a center axis A and outwardly in a radial direction R.

The lens 100 may have a first portion 120, which may be a bottom portion. The first portion 120 may form a first annular ring about the center axis A. The first portion 120 may include a first inner surface 124 that is convex and a first outer surface 128, the shape of which is discussed below. The first portion 120 may be oriented so that a first tangent 132 to the first inner surface 124 is at a first angle 133 to the center axis A, wherein the first angle 133 is less than forty-five degrees, more specifically or as an alternative the first angle 133 is less than thirty degrees, and more specifically or as an alternative the first tangent 132 to the first inner surface 124 is substantially parallel to the center axis A.

A second portion 136 of the lens 100 may be an intermediate portion. The second portion 136 may be continuous with the first portion 120. The second portion 136 may form a second annular ring about the center axis A. The second portion 136 may include a second inner surface 140 that is convex and a second outer surface 144, the shape of which is discussed below. The second portion 136 may be oriented so that a second tangent 148 to the second inner surface 140 is canted toward the center axis A. The canted angle may be an acute angle and may be forty-five degrees.

A third portion 152 of the lens 100 may be a top portion. The third portion 152 may be continuous with the second portion 136 to enclose the lens 100. The third portion 152 may form an annular solid disk about the center axis A. The third portion 152 may include a third inner surface 156 that is convex and a third outer surface 160, the shape of which is discussed below.

As illustrated in FIG. 2, the first inner surface 124, the second inner surface 140 and the third inner surface 156 together may form a lens composite inner surface that may be aberration-free and continuous. In addition the first outer surface 128, the second outer surface 144 and the third outer surface 160 may each be convex and together may form a lens composite outer surface that may be an aberration-free and continuous dome. In addition, the lens composite outer surface is substantially hemispherical.

As further illustrated in FIG. 2, a bottom surface 164 of the bottom portion 120 may be substantially planar. This may to provide a base on a PCB board.

To provide desired optics, the lens 100 may be thickest along the bottom surface 164 of the first portion 120 and the lens 100 may be thinnest at a first interface 168 between the second portion 136 and the third portion 152. In addition, the lens 100 may continuously increase in thickness in the second portion 136 between the first interface 168 and a second interface 172 between the first portion 120 and the second portion 136. Further, as illustrated, the lens 100 may continuously increase in thickness in the first portion 120 between the second interface 172 and the bottom surface 164.

For reasons discussed below, a bottom edge 175 of the first outer surface 128 may be circular having an outer surface diameter DO. The contour and shape of the outer surface of the lens 100 above the bottom edge 175, however, may be a function of the above identified geometry and optics. In one embodiment, cross sectional slices of the lens 100 that are parallel to and above the bottom edge 175 of the first outer surface 128 may be circular.

As further illustrated, the lens 100 may include a fourth portion 176 that is a base portion that extends axially below the first portion 120. The fourth portion 176 may be cylindrical and may have a fourth outer surface 180 that is continuous with the first outer surface 128. The fourth portion 176 may include a fourth inner surface 188 that extends downwardly from the bottom surface 164 of the first portion 120. The fourth inner surface 188 forms a PCB centering flange having a flange height HF and flange diameter DF that, along with the bottom surface 164 of the lens 100, are configured to receive the PCB 106 of the array 104 of LEDs. As illustrated, the flange diameter DF may form the diameter of the bottom surface 164.

The fourth portion 176 may include a radially extending lip 192 configured to be gripped by a retaining structure within the VAD 108 to secure the lens 100 within the VAD 108. Materials used for manufacturing the lens 100 may include acrylic, polycarbonate, or the like.

Figure 3:
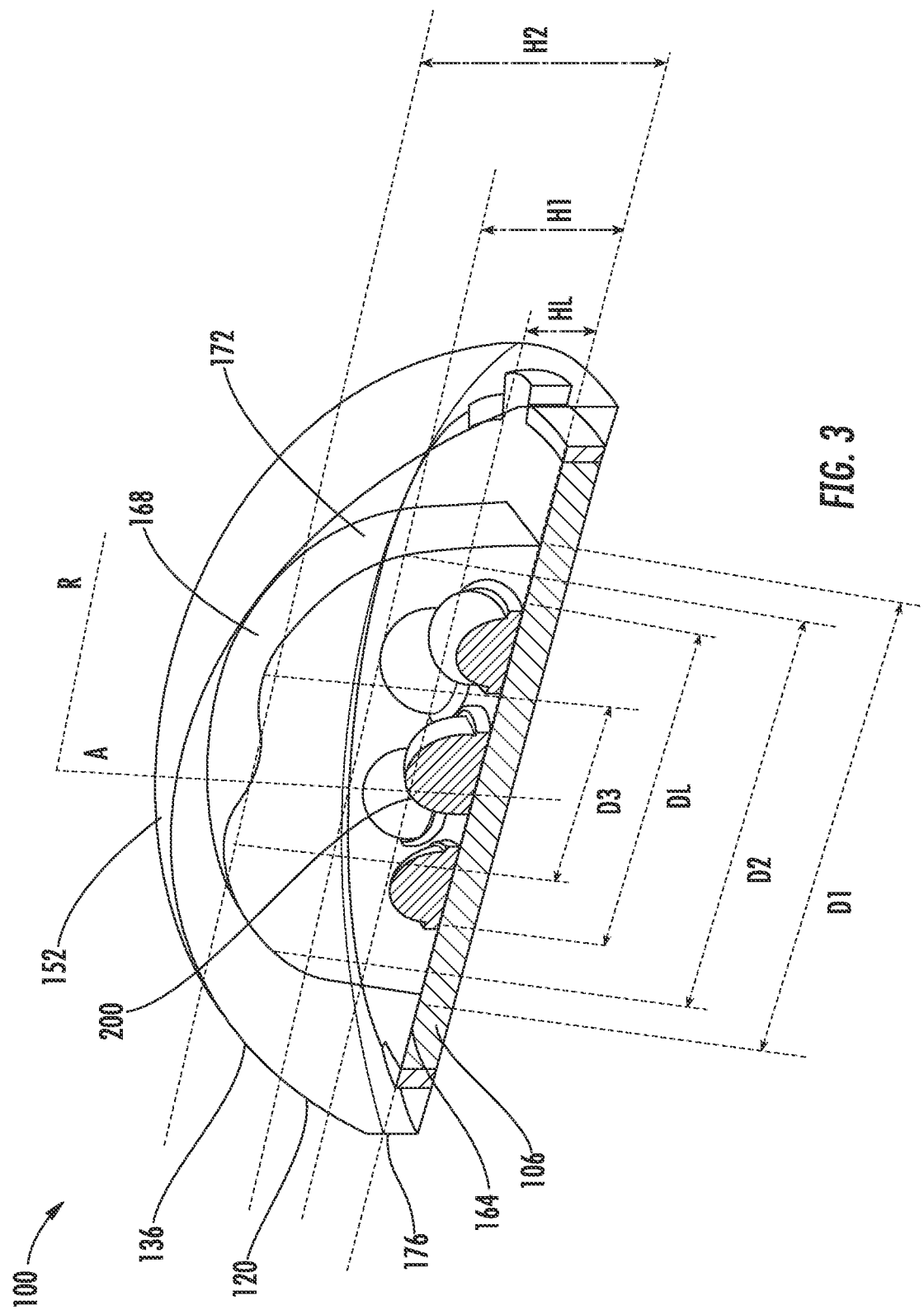
FIG. 3 illustrates a cross sectional view of a lens and printed circuit board according to an embodiment.

The PCB 106 is illustrated having a thickness or span in the axial direction A of the lens that may be substantially HF. In addition, the PCB 106 has an outer diameter that may be substantially DF. Turning to FIG. 3, the lens 100 is illustrated wherein the lip 192 in the fourth portion 176 has been omitted for clarity of discussion. The height of an LED element 200 may be HL. To obtain the above described optics, a first height H1 of the first portion 120 may be between seventy five percent of HL and three times HL, that is $0.75*HL<H1<3*HL$. In one embodiment, H1 may be substantially the same as HL. In addition, a second height H2 of the second portion 136 may be between three and five times HL, that is $3*HL<H2<5*HL$, and in one embodiment $3*HL<H2<4*HL$.

The outer diameter of the LED array 104 may be DL. A first diameter D1 of the first portion 120 at the bottom surface 164 may be between one and a quarter and two times DL, or $1.25*DL<D1<2*DL$. In addition a second diameter D2 at the second interface 172 between the first portion 120 and the second portion 136 may be between one and one and a half times DL, or $DL<D2<1.5*DL$. A third diameter D3 at the first interface 168 of the second portion 136 and third portion 152 may be between one-half and one times DL, or $0.5*DL<D3<DL$.

The ranges and ratios identified herein for the disclosed embodiments are for reference only. One of ordinary skill reading this document would readily understand that the disclosed ranges and ratios are not intended to be limiting. For example, where an LED element has a height that differs from HL, and/or an array of LEDS has a diameter that differs from DL, lens designs falling outside the ranges disclosed herein that provide benefits identified herein would fall within the scope of this disclosure.

Figure 4:
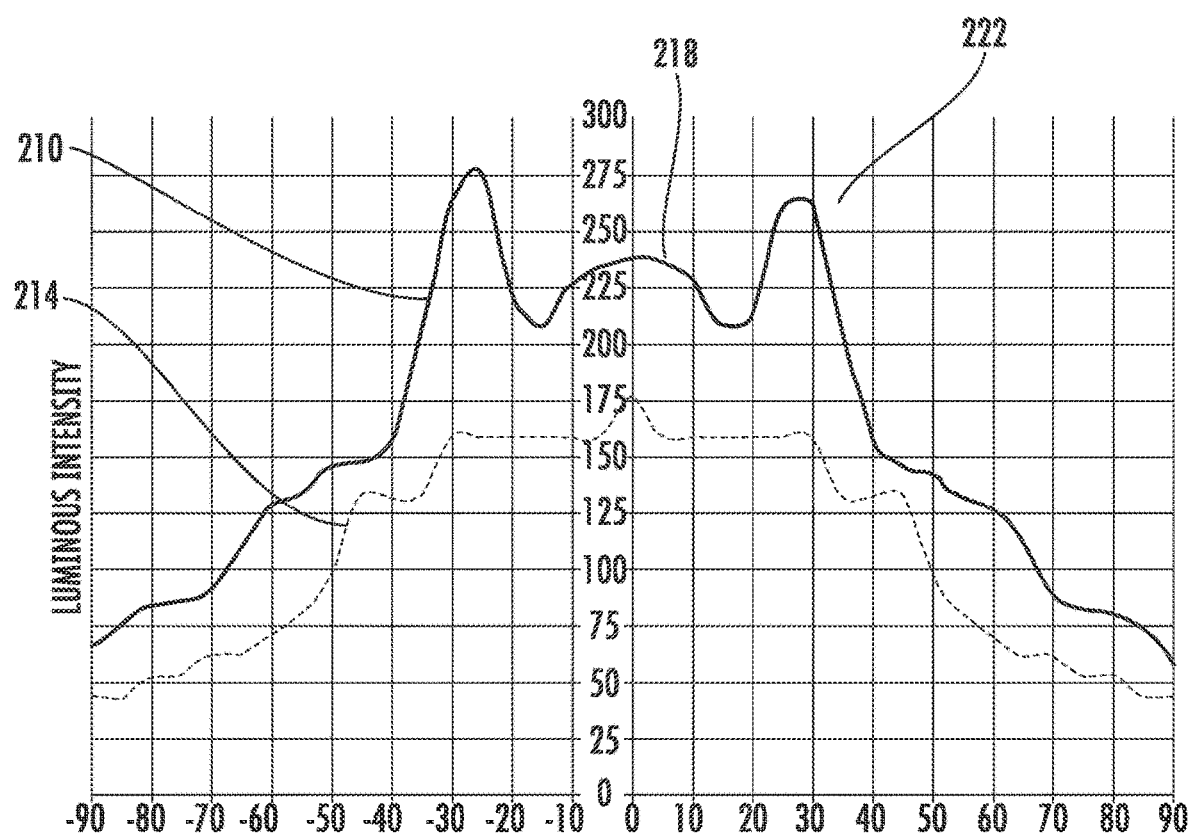
FIG. 4 illustrates light output according to a disclosed embodiment.

Turning to FIG. 4, light output from the above configuration is illustrated. Curve 210 may illustrate light output of the above disclosed embodiment while curve 214 may be light output compliant with the UL 1971 standard, or other specification detailing a minimum light output requirement, which governs many public mode fire applications in the Americas and the Middle East and is a performance standard (a similar performance standard, EN54, is primarily used in Europe). UL 1971 includes specific light output and distribution requirements to ensure illumination throughout a defined area. The requirements stipulate a minimum flash rate of between about 1 Hz and 2 Hz (e.g., about 1.2 Hz), categorizes minimum light intensities by area: non-sleeping (15 cd), corridor (15 cd) and sleeping areas (110 cd for walls or 177 cd for ceilings). In particular, the UL 1971 standard requires a polar light distribution pattern to enhance the likelihood of alerting hearing impaired individuals throughout an area that an emergency such as a first is occurring (the pattern also includes "compound 45s"—eight light spots around a cross). The term "polar" refers to the way the standard measures light intensity: both horizontally and vertically at viewing angles ranging from 0 to 180 degrees.

As illustrated, the light output of the disclosed embodiments may meet and/or exceed the minimum standards illustrated in FIG. 4 along the entire distribution pattern. In addition, the light output of the disclosed embodiments may be concentrated in directed locations about the lens 100. For example, in comparison with light emitted at the third portion 152 of the lens 100, illustrated by curve portion 218, other areas about the lens 108 may provide yet stronger illumination, as illustrated by curve portion 222.

Accordingly, the lens 100 design has been shaped to provide light intensity output all about the surface of the lens that wherein the light is significantly more intense than otherwise available for the LEDs therein. For example, the luminosity of a packed (7) seven LED board may meet or exceed the luminosity of a packed (10) ten LED board having the same type of LED elements. Benefits of the disclosed design may include focusing and directing and distributing light from a board of packed LEDs to maximize light directionality.

The term "about" is intended to include the degree of error associated with measurement of the particular quantity based upon the equipment available at the time of filing the application. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A lens for covering an array of light emitting diodes (LED) mounted to a printed circuit board (PCB) in a visual alarm device (VAD), the lens being a dome lens extending upwardly in an axial direction about a center axis and outwardly in a radial direction, the lens comprising:
   a first portion which is a bottom portion, the first portion forming a first annular ring about the center axis, the first portion including a first inner surface and a first outer surface, wherein the first portion is oriented so that a first tangent to the first inner surface is at a first angle to the center axis, wherein the first angle is less than forty-five degrees,
   a second portion which is an intermediate portion, the second portion being continuous with the first portion, the second portion forming a second annular ring about the center axis, the second portion including a second inner surface and a second outer surface, wherein the second portion is oriented so that a second tangent to the second inner surface is canted toward the center axis,
   a third portion which is a top portion that is continuous with the second portion to enclose the lens, the third portion forming an annular solid disk about the center axis, the third portion including a third inner surface and a third outer surface,
   wherein:
   the first inner surface, the second inner surface and the third inner surface together form a lens composite inner surface that is aberration-free, continuous and aspheric;
   the first outer surface, the second outer surface and the third outer surface are each convex and together form a lens composite outer surface that, from the first outer surface to the third outer surface, is an aberration-free and continuously convex dome, wherein the third outer surface defines a hemispherical shape; and
   the lens includes a fourth portion which is a base portion that extends axially below the first portion, the fourth portion being cylindrical and having a fourth outer surface that is continuous with, and has a same outer diameter as, the first outer surface, and
   a fourth inner surface that extends downwardly from the bottom surface of the first portion, wherein the fourth inner surface and the bottom surface are configured to be positioned against the PCB; and
   wherein the lens is thickest along the bottom surface of the first portion; and
   wherein the lens is thinnest at a first interface between the second portion and the third portion; and
   wherein the lens continuously increases in thickness in the second portion between the first interface and a second interface between the first portion and the second portion; and
   wherein the lens is positioned against the PCB, with a LED element in the LED array having a height HL and the LED array having a diameter of DL:
   a first height H1 of the first portion is $0.75*HL<H1<3*HL$,
   a second height H2 of the second portion is $3*HL<H2<5*HL$,
   a first diameter D1 of the first portion is $1.25*DL<D1<2*DL$,
   a second diameter D2 at the second interface is $DL<D2<1.5*DL$,
   a third diameter D3 at the first interface is $0.5*DL<D3<DL$.

2. The lens of claim 1, wherein the first angle is less than thirty degrees.

3. The lens of claim 1, wherein the first tangent to the first inner surface is substantially parallel to the center axis.

4. The lens of claim 1, wherein a bottom surface of the first portion is substantially planar.

5. The lens of claim 1, wherein the lens continuously increases in thickness in the first portion between the second interface and the bottom surface.

6. A visual alarm device (VAD) comprising: a printed circuit board (PCB) including an array of light emitting diodes (LED); and a lens covering the PCB, the lens being a dome lens extending upwardly in an axial direction about a center axis and outwardly in a radial direction, and the lens of claim 1.

7. The VAD of claim 6, wherein the first angle is less than thirty degrees.

8. The VAD of claim 6, wherein the first tangent to the first inner surface is substantially parallel to the center axis.

9. The VAD of claim 6, wherein a bottom surface of the first portion is substantially planar.

10. The VAD of claim 6, wherein the lens is thinnest at a first interface between the second portion and the third portion.

11. The VAD of claim 10, wherein the lens continuously increases in thickness in the second portion between the first interface and a second interface between the first portion and the second portion.

12. The VAD of claim 11, wherein the lens continuously increases in thickness in the first portion between the second interface and the bottom surface.

13. The VAD of claim 12, wherein the lens includes a fourth portion which is a base portion that extends axially below the first portion, the fourth portion being cylindrical and having a fourth outer surface that is continuous with the first outer surface, and a fourth inner surface that extends downwardly from the bottom surface of the first portion, wherein the fourth inner surface and the bottom surface are configured to be positioned against the PCB.

14. The VAD of claim 10, wherein when the lens is positioned against the PCB, with a LED element in the LED array having a height HL and the LED array having a diameter of DL:
- a first height H1 of the first portion is $0.75*HL<H1<3*HL$,
- a second height H2 of the second portion is $3*HL<H2<5*HL$,
- a first diameter D1 of the first portion is $1.25*DL<D1<2*DL$,
- a second diameter D2 at the second interface is $DL<D2<1.5*DL$,
- a third diameter D3 at the first interface is $0.5*DL<D3<DL$.

15. A method of refracting light from an array of LEDs in a visual alarm device (VAD) comprising directing light from the array of LEDs through the lens of claim 1.

16. The method of claim 15, wherein when the lens is positioned against the PCB, with a LED element in the LED array having a height HL and the LED array having a diameter of DL:
- a first height H1 of the first portion is $0.75*HL<H1<3*HL$,
- a second height H2 of the second portion is $3*HL<H2<5*HL$,
- a first diameter D1 of the first portion is $1.25*DL<D1<2*DL$,
- a second diameter D2 at the second interface is $DL<D2<1.5*DL$,
- a third diameter D3 at the first interface is $0.5*DL<D3<DL$.

* * * * *